United States Patent [19]

Nagase et al.

[11] Patent Number: 5,500,856
[45] Date of Patent: Mar. 19, 1996

[54] TRANSMISSION DE-CORRELATOR FOR ELIMINATING INTERFERENCE IN A CDMA COMMUNICATION SYSTEM

[75] Inventors: Taku Nagase, Tokyo; Roland Go, Yokohama, both of Japan; Tadashi Matsumoto, Walnut Creek, Calif.; Akihiro Higashi, Yokosuka, Japan

[73] Assignees: Matsushita Communication Industrial Co., Ltd., Yokohama; NTT Mobile Communications Network, Inc., Tokyo, both of Japan

[21] Appl. No.: 281,640

[22] Filed: Jul. 28, 1994

[30] Foreign Application Priority Data

Jul. 30, 1993 [JP] Japan ................................ 5-190646

[51] Int. Cl.$^6$ ................... H04J 13/02; H04B 7/216; H04B 15/00
[52] U.S. Cl. ................... 370/18; 375/205; 375/210; 455/63
[58] Field of Search ................... 370/18, 95.1, 95.3; 375/1, 34, 58, 60, 205, 206, 210, 346; 379/58, 59; 455/33.1, 50.1, 53.1, 54.1, 57.1, 63, 38.3, 343; 380/34

[56] References Cited

U.S. PATENT DOCUMENTS

| | | | |
|---|---|---|---|
| 5,105,435 | 4/1992 | Stilwell | 370/18 |
| 5,136,612 | 8/1992 | Bi | 370/18 |
| 5,224,122 | 6/1993 | Bruckert | 370/18 |
| 5,235,612 | 8/1993 | Stilwell et al. | 370/18 |
| 5,257,283 | 10/1993 | Gilhousen et al. | 370/18 |
| 5,293,404 | 3/1994 | Shibata | 375/60 |
| 5,343,496 | 8/1994 | Honig et al. | 370/18 |

OTHER PUBLICATIONS

ICC '93, vol. 1/3, May 1993, N.Y., USA, pp. 156–160, XP000371085, Schotten et al, 'Iterative Construction of Sequences with Low Crosscorrelation Values'.

IEEE Transactions On Communications, vol. 41, No. 2, New York U.S., pp. 285–290, XP000392932, Duel–Hallen 'Decorrelating Decision–Feedback Multiuser Detector for Synchronous Code–Division Multiple–Access Channel'.

*Primary Examiner*—Hassan Kizou
*Attorney, Agent, or Firm*—Pollock, Vande Sande & Priddy

[57] ABSTRACT

A base station of a CDMA communication system includes a transmission de-correlator for eliminating interferences between communication channels of a downlink. The transmission de-correlator has a memory storing a set of data representative of the products of transmission information bits for the respective channels, and the sums of the products of the spread code data sequences for the respective channels, and the elements of an inverse matrix with respect to a predetermined matrix of a cross-correlation between the spread code data sequences for the respective channels. The sums correspond to additions of the products along a direction of columns or to additions of the products along a direction of rows of the inverse matrix. A counting device is operative for causing the memory to sequentially output the data therefrom. An adder serves to calculate a sum of the data outputted from the memory.

3 Claims, 8 Drawing Sheets

| ADDRESS | DATA |
|---|---|
| (0, 0) | $\sum_y 0 \cdot SC\#y(0) \cdot C_{iy}$ |
| (0, 1) | $\sum_y 0 \cdot SC\#y(1) \cdot C_{iy}$ |
| (0, k) | $\sum_y 0 \cdot SC\#y(k) \cdot C_{iy}$ |
| (0, $2^m-1$) | $\sum_y 0 \cdot SC\#y(2^m-1) \cdot C_{iy}$ |

FIG. 4

| ADDRESS | DATA |
|---|---|
| (1, 0) | $\sum_y 1 \cdot SC\#y(0) \cdot C_{iy}$ |
| (1, 1) | $\sum_y 1 \cdot SC\#y(1) \cdot C_{iy}$ |
| (1, k) | $\sum_y 1 \cdot SC\#y(k) \cdot C_{iy}$ |
| (1, $2^m-1$) | $\sum_y 1 \cdot SC\#y(2^m-1) \cdot C_{iy}$ |

| SUB MEMORY \ ADDRESS | (0, 0) | (0, 1) | ... | (0, k) | ... | $(0, 2^m-1)$ |
|---|---|---|---|---|---|---|
| M#1 | $0 \cdot SC\#1(0) \cdot C_{i1}$ | $0 \cdot SC\#1(1) \cdot C_{i1}$ | | $0 \cdot SC\#1(k) \cdot C_{i1}$ | | $0 \cdot SC\#1(2^m-1) \cdot C_{i1}$ |
| M#2 | $0 \cdot SC\#2(0) \cdot C_{i2}$ | $0 \cdot SC\#2(1) \cdot C_{i2}$ | | $0 \cdot SC\#2(k) \cdot C_{i2}$ | | $0 \cdot SC\#2(2^m-1) \cdot C_{i2}$ |
| ... | | | | | | |
| M#j | $0 \cdot SC\#j(0) \cdot C_{ij}$ | $0 \cdot SC\#j(1) \cdot C_{ij}$ | | $0 \cdot SC\#j(k) \cdot C_{ij}$ | | $0 \cdot SC\#j(2^m-1) \cdot C_{ij}$ |
| ... | | | | | | |
| M#N | $0 \cdot SC\#N(0) \cdot C_{iN}$ | $0 \cdot SC\#N(1) \cdot C_{iN}$ | | $0 \cdot SC\#N(k) \cdot C_{iN}$ | | $0 \cdot SC\#N(2^m-1) \cdot C_{iN}$ |

ROM#j

FIG. 9

| SUB MEMORY \ ADDRESS | (1, 0) | (1, 1) | ... | (1, k) ← ROM#j | ... | (1, $2^m-1$) |
|---|---|---|---|---|---|---|
| M#1 | $1 \cdot SC\#1(0) \cdot Ci1$ | $1 \cdot SC\#1(1) \cdot Ci1$ | | $1 \cdot SC\#1(k) \cdot Ci1$ | | $1 \cdot SC\#1(2^m-1) \cdot Ci1$ |
| M#2 | $1 \cdot SC\#2(0) \cdot Ci2$ | $1 \cdot SC\#2(1) \cdot Ci2$ | | $1 \cdot SC\#2(k) \cdot Ci2$ | | $1 \cdot SC\#2(2^m-1) \cdot Ci2$ |
| ... | | | | | | |
| M#j | $1 \cdot SC\#j(0) \cdot Cij$ | $1 \cdot SC\#j(1) \cdot Cij$ | | $1 \cdot SC\#j(k) \cdot Cij$ | | $1 \cdot SC\#j(2^m-1) \cdot Cij$ |
| ... | | | | | | |
| M#N | $1 \cdot SC\#N(0) \cdot CiN$ | $1 \cdot SC\#N(1) \cdot CiN$ | | $1 \cdot SC\#N(k) \cdot CiN$ | | $1 \cdot SC\#N(2^m-1) \cdot CiN$ |

5,500,856

TRANSMISSION DE-CORRELATOR FOR ELIMINATING INTERFERENCE IN A CDMA COMMUNICATION SYSTEM

BACKGROUND OF THE INVENTION

1. Field of the Invention

This invention relates to a CDMA (code division multiple access) communication apparatus usable in a communication system such as a mobile communication system or a wire communication system.

2. Description of the Prior Art

In a typical CDMA communication system, a base station can communicate with mobile stations to which different pseudo-noise codes (spread codes) are assigned respectively. In the base station, base-band information pieces to be transmitted to the mobile stations are modulated in response to the pseudo-noise codes respectively, before being combined and multiplexed into a composite information signal. Then, a carrier is modulated in response to the composite information signal. The base station transmits the resultant modulated carrier toward the mobile stations via a downlink. Each of the mobile stations receives the modulated carrier. At each of the mobile stations, the composite information signal is recovered from the received carrier, and then the composite information signal is demodulated into the related base-band information piece in response to the assigned pseudo-noise code.

Generally, the base station is provided with a transmission de-correlator for processing pseudo-noise coded information to prevent or eliminate interferences between communication channels in the downlink. As will be described later, a prior-art transmission de-correlator tends to be complicated in structure.

SUMMARY OF THE INVENTION

It is an objective of this invention to provide an improved CDMA (code division multiple access) communication apparatus.

In a base station of a CDMA communication system, a transmission de-correlator for eliminating interferences between communication channels of a downlink, according to a first aspect of this invention, comprises a memory storing a set of data. The data is representative of the products of transmission information bits for the respective channels, and the sums of the products of the spread code data sequences for the respective channels, and the elements of an inverse matrix with respect to a predetermined matrix of a cross-correlation between the spread code data sequences for the respective channels, wherein sad sums correspond to additions of the products along one direction of columns or to additions of the products along one direction of rows of the inverse matrix. A counting means addresses the memory to sequentially output the data therefrom; and an adder calculates a sum of the data outputted from the memory.

In a base station of a CDMA communication system, a transmission de-correlator for eliminating interferences between communication channels of a downlink, according to a second aspect of this invention comprises a memory, storing a set of data, representative of the products of multi-bit transmission information pieces for the respective channels, and the sums of the products of the spread code data sequences for the respective channels, and the elements of an inverse matrix with respect to a predetermined matrix of a cross-correlation between the spread code data sequences for the respective channels. The multi-bit transmission information pieces contain power information pieces for power controls of the respective channels, and wherein said sums correspond to additions of the products along one of a direction of columns or to additions of the products along one of a direction of rows of the inverse matrix; a counting means for causing the memory to sequentially output the data therefrom; and an adder for calculating a sum of the data outputted from the memory.

In a base station of a CDMA communication system, a transmission de-correlator for eliminating interferences between communication channels of a downlink according to a third aspect of this invention comprises means for generating information pieces to be transmitted for the respective channels; a storage unit including a plurality of memories; means for applying the generated information pieces to the memories as first portions of address signals respectively; means for generating second portions of the address signals and applying the generated second portions of the address signals to the memories respectively. The second portions of the address signals are periodically updated; wherein each of the memories contains a plurality of storage segments which are designated by different states of a related address signal respectively, said storage segments storing respective predetermined data pieces, wherein said predetermined data pieces depend on products of possible states of the information piece to be transmitted for a related communication channel, predetermined spread codes, and elements of an inverse matrix with respect to a predetermined matrix of a cross-correlation between the spread codes, and wherein in each of the memories, one of the storage segments is accessed in response to the related address signal and the data piece is outputted from the accessed storage segment; and means for adding data pieces outputted from the memories.

DESCRIPTION OF THE PREFERRED EMBODIMENTS

A prior-art transmission de-correlator in a base station of a CDMA communication system will now be described for a better understanding of this invention.

Figure 1:
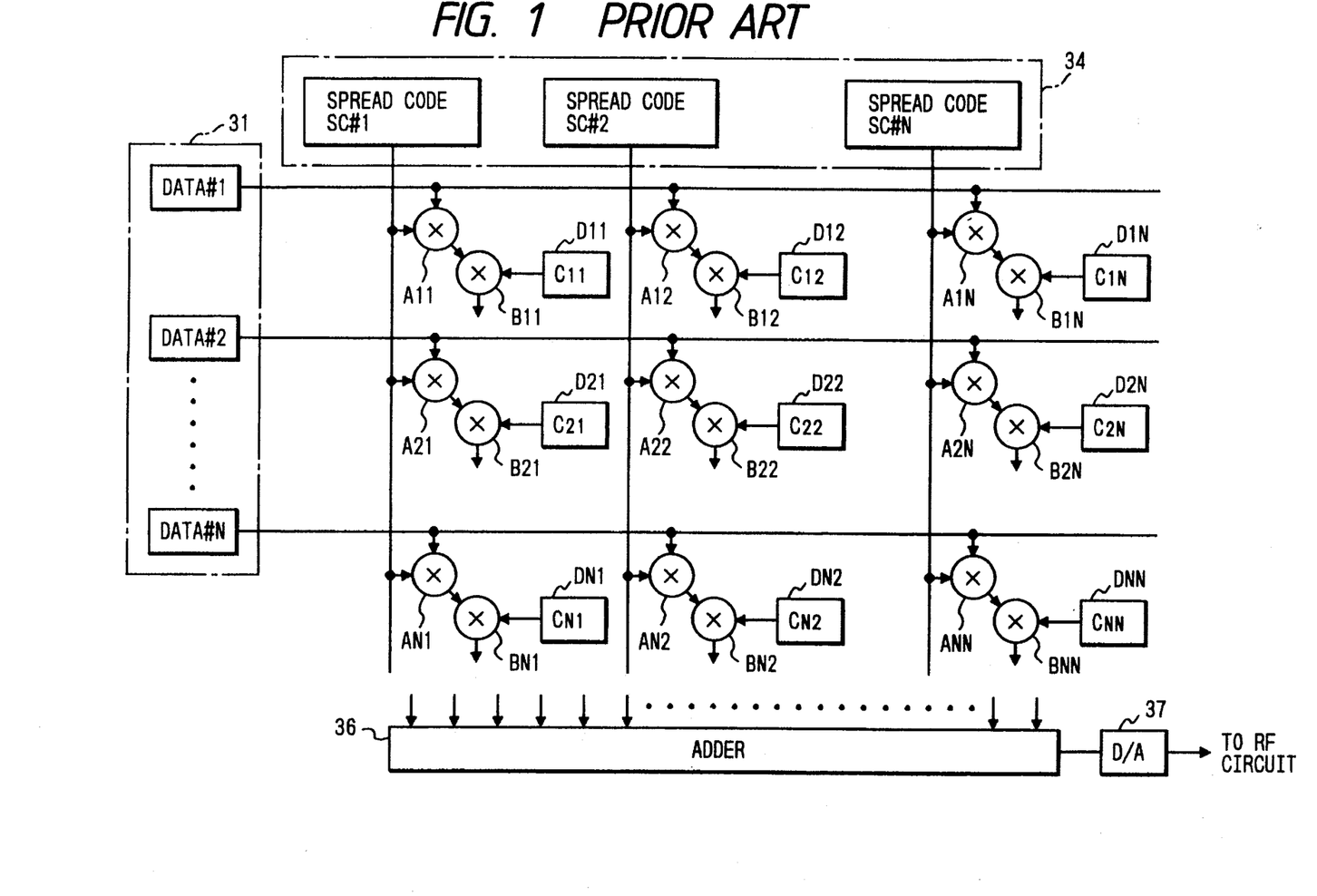
FIG. 1 is a block diagram of a prior-art transmission de-correlator.

With reference to FIG. 1, the prior-art transmission de-correlator includes a base-band data generator 31, a mixing circuit 32, a spread code generator 34, an adder 36, and a D/A converter 37.

The base-band data generator 31 outputs N data bit sequences DATA#1, DATA#2, ..., and DATA#N for respective channels #1, #2, ..., and #N where N denotes a given natural number. The data bit sequences DATA#1, DATA#2, ..., and DATA#N are base-band information pieces to be transmitted to mobile stations, respectively.

The spread code generator 34 outputs different spread codes (pseudo-noise codes) for the respective channels #1, #2, ..., and #N. The spread codes are assigned to the mobile stations, respectively.

The mixing circuit 32 receives the data bit sequences DATA#1, DATA#2, ..., and DATA#N from the base-band data generator 31. The mixing circuit 32 receives the spread codes from the spread code generator 34.

The mixing circuit 32 is divided into cells arranged in a matrix. The data bit sequences DATA#1, DATA#2, ..., and DATA#N are applied to rows of the matrix, respectively. The spread codes are applied to columns of the matrix, respectively.

Each of the cells in the matrix of the mixing circuit 32 includes multipliers Aij and Bij and a register Dij where 'i' denotes a related row order number and "j" denotes a related column order number. For example, in the second-row first-column cell, the multipliers and the register are denoted by A21, B21, and D21 respectively. The multiplier Aij receives the data bit sequence DATA#i and the spread code for the channel #j, and multiplies them to modulate the data bit sequence DATA#i in response to the spread code for the channel #j. The register Dij stores data representing a predetermined coefficient Cij. The predetermined coefficients C11, ..., and CNN in the cells are designed to cancel or eliminate interferences between the channels #1, #2, ..., and #N. Specifically, the predetermined coefficients C11, ..., and CNN are equal to the respective elements of an inverse matrix with respect to a predetermined matrix representing a cross-correlation between the spread codes for the channels #1, #2, ..., and #N. The multiplier Bij receives the output signal from the multiplier Aij and also receives the coefficient data Cij from the register Dij, and multiplies them.

The adder 36 receives the output signals from the multipliers B11, ..., BNN in the cells in the matrix of the mixing circuit 32. The adder 36 adds and combines the output signals from the multipliers B11, ..., BNN into a digital composite or multiplexed information signal. The adder 36 outputs the digital multiplexed information signal to the D/A converter 37.

The D/A converter 37 changes the digital multiplexed information signal into a corresponding analog multiplexed information signal. The D/A converter 37 outputs the analog multiplexed information signal to a modulator in an RF circuit (not shown) which modulates an RF carrier in response to the analog multiplexed information signal. The RF circuit transmits the resultant modulated RF carrier to the mobile stations.

The prior-art transmission de-correlator tends to be complicated in structure since the multipliers A11, ..., and ANN and the multipliers B11, ..., and BNN are provided therein.

Figure 2:
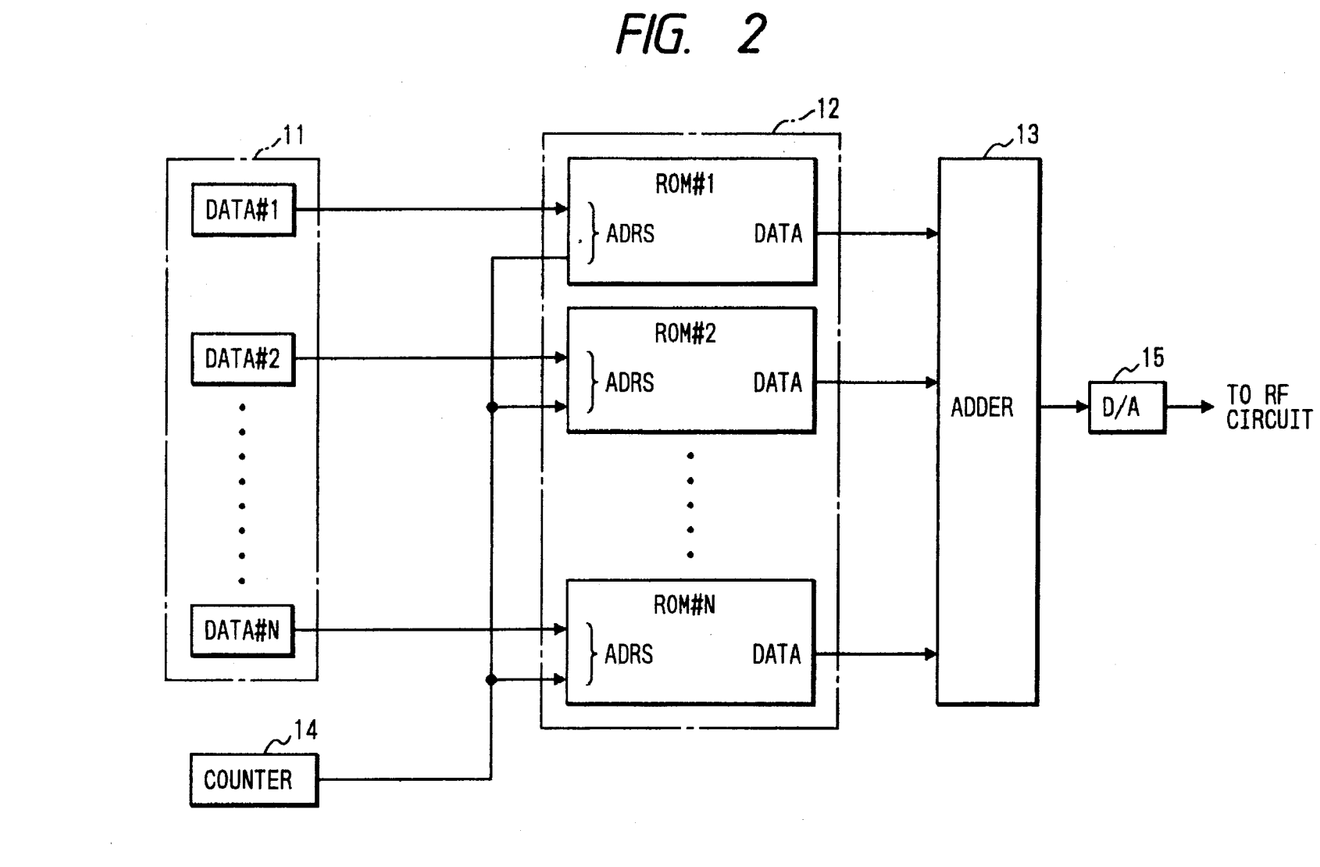
FIG. 2 is a block diagram of a transmission de-correlator according to a first embodiment of this invention.

FIG. 2 shows a transmission de-correlator in a base station of a CDMA communication system according to a first embodiment of this invention. As shown in FIG. 2, the transmission de-correlator includes a base-band data generator 11, a storage unit 12, an adder 13, a counter 14, and a D/A converter 15. The base-band data generator 11 is connected to the storage unit 12. The counter 14 is connected to the storage unit 12. The storage unit 12 is connected to the adder 13. The adder 13 is connected to the D/A converter 15.

The base-band data generator 11 outputs N data bit sequences DATA#1, DATA#2, ..., and DATA#N for respective channels #1, #2, ..., and #N where N denotes a given natural number. The data bit sequences DATA#i, DATA#2, ..., and DATA#N are base-band information pieces to be transmitted to mobile stations respectively. Generally, the data bit sequences DATA#1, DATA#2, ..., and DATA#N have equal periods corresponding to one bit time.

The counter 14 receives a clock pulse signal (not shown) and counts up pulses in the clock pulse signal. The value represented by the output signal of the counter 14 periodically and cyclically changes from "0" to "$2^m-1$" one by one where "m" denotes a given natural number. After the counter value reaches "$2^m-1$", it is reset to "0" at a next period. The period of the clock pulse signal fed to the counter 14 is equal to the period of the data bit sequences DATA#1, DATA#2, ..., and DATA#N.

The storage unit 12 includes read-only memories ROM#1, ROM#2, ..., and ROM#N corresponding to the respective channels #1, #2, ..., and #N. As will be made clear later, the memories ROM#1, ROM#2, ..., and ROM#N store predetermined data. The data bit sequences DATA#1, DATA#2, ..., and DATA#N are applied to the memories ROM#1, ROM#2, ..., and ROM#N respectively. In addition, the output signal of the counter 14 is applied to all the memories ROM#1, ROM#2, ..., and ROM#N.

Regarding each ROM#i of the memories ROM#1, ROM#2, ..., and ROM#N, the data bit sequence DATA#i and the output signal of the counter 14 compose a multi-bit address signal where "i" denotes 1, 2, ..., or N. The data bit sequence DATA#i is used as the highest bit of the address signal while the output signal of the counter 14 is used as remaining bits (the second highest bit to the lowest bit) of the address signal. Each memory ROM#i has an array of storage segments to which different addresses are assigned respectively. In each memory ROM#i, the storage segments store predetermined different data pieces respectively. In each memory ROM#i, during every period determined by the clock pulse signal, one of the storage segments is accessed in response to the address signal, and the data piece is outputted from the accessed storage segment as output data from the memory ROM#i.

Different spread codes (pseudo-noise codes) SC#1, SC#2, ..., and SC#N are assigned to the respective channels #1, #2, ..., and #N. The spread codes SC#1, SC#2, ..., and SC#N correspond to respective predetermined data bit sequences having a 2m-bit length or period. Thus, each spread code SC#i has a temporal sequence of $2^m$ bits SC#i(0), SC#i(1), ..., and SC#i($2^m-1$) where "i" denotes 1, 2, ..., or N.

A set of predetermined coefficients C11, ..., and CNN are designed to cancel or eliminate interferences between the channels #1, #2, ..., and #N. Specifically, the predetermined coefficients C11, ..., and CNN are equal to the respective elements of an inverse matrix, with respect to a predetermined matrix representing a cross-correlation between the spread codes SC#1, SC#2, ..., and SC#N for the channels #1, #2, ..., and #N.

As previously described, in each memory ROM#i, one of the storage segments is accessed in response to a multi-bit address signal (A, B), where "A" denotes a first address portion represented by the highest bit and "B" denotes a second address portion represented by the remaining bits (the second highest bit to the lowest bit). The data bit sequence DATA#i is used as the highest bit of the address signal while the output signal of the counter 14 is used as the remaining bits of the address signal. The first address portion "A" is "0" or "1". The second address portion "B" is one of "0" to "$2^m-1$". In each memory ROM#i, the storage segments are designated by different states (addresses) of the address signal (A, B) respectively, and the storage segments store different predetermined data pieces.

Figure 3:
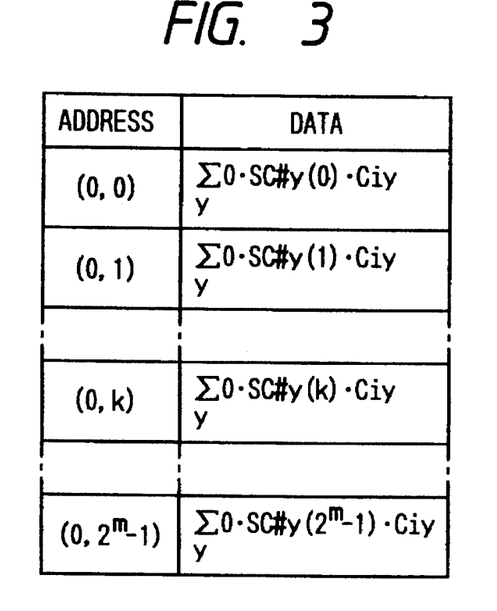
FIG. 3 and FIG. 4 are diagrams of the relation between addresses and data in a memory within a storage unit in FIG. 2.

In each memory ROM#i, as shown in FIG. 3, the storage segment designated by the address signal (0, k) stores data piece representing the sum of the multiplication (product) of "0", the spread code bit SC#1(k), and the coefficient Ci1, the multiplication (product) of "0", the spread code bit SC#2(k), and the coefficient Ci2, . . . , and the multiplication (product) of "0", the spread code bit SC#N(k), and the coefficient CiN where "k" denotes 0, 1, 2, . . . , or $2^m-1$. In other words, the storage segment designated by the address signal (0, k) stores data piece representing the value V(0, k) given as:

$$V(0,k) = \sum_{y=1}^{N} 0 \cdot SC\#y(k) \cdot Ciy = 0 \cdot \sum_{y=1}^{N} SC\#y(k) \cdot Ciy \quad (1)$$

Figure 4:
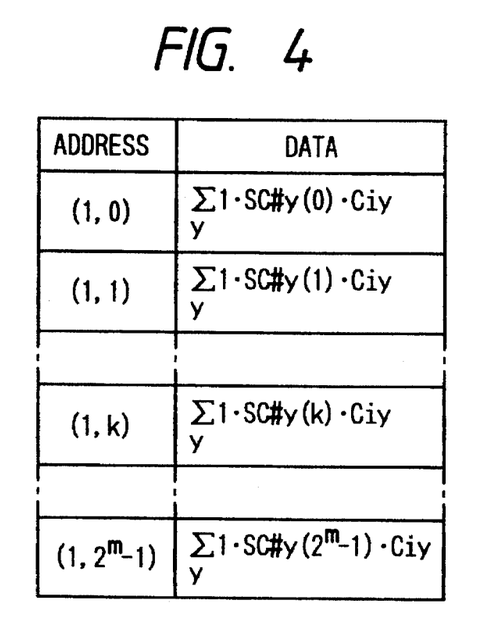

In each memory ROM#i, as shown in FIG. 4, the storage segment designated by the address signal (1, k) stores data piece representing the sum of the multiplication (product) of "1", the spread code bit SC#1(k), and the coefficient Ci1, the multiplication (product) of "1", the spread code bit SC#2(k), and the coefficient Ci2, . . . , and the multiplication (product) of "1", the spread code bit SC#N(k), and the coefficient CiN where "k" denotes 0, 1, 2, . . . , or $2^m-1$. In other words, the storage segment designated by the address signal (1, k) stores data piece representing the value V(1, k) given as:

$$V(1,k) = \sum_{y=1}^{N} 1 \cdot SC\#y(k) \cdot Ciy = 1 \cdot \sum_{y=1}^{N} SC\#y(k) \cdot Ciy \quad (2)$$

In each memory ROM#i, one of the storage segments is accessed in response to the address signal (A, B) as follows. When the current bit in the data bit sequence DATA#i represents "0" and the output signal from the counter 14 represents "k", that is, when the address signal (A, B) assumes a state of (0, k), an access is given to the storage segment storing the data piece representing the previously-indicated value V(0, k). Therefore, in this case, the data piece representing the sum of the multiplication (product) of "0", the spread code bit SC#1(k), and the coefficient Ci1, the multiplication (product) of "0", the spread code bit SC#2(k), and the coefficient Ci2, . . . , and the multiplication (product) of "0", the spread code bit SC#N(k), and the coefficient CiN is outputted from the accessed storage segment. When the current bit in the data bit sequence DATA#i represents "1" and the output signal from the counter 14 represents "k", that is, when the address signal (A, B) assumes a state of (1, k), an access is given to the storage segment storing the data piece representing the previously-indicated value V(1, k). Therefore, in this case, the data piece representing the sum of the multiplication (product) of "1", the spread code bit SC#1(k), and the coefficient Ci1, the multiplication (product) of "1", the spread code bit SC#2(k), and the coefficient Ci2, . . . , and the multiplication (product) of "1", the spread code bit SC#N(k), and the coefficient CiN is outputted from the accessed storage segment.

During every period determined by the clock pulse signal, the memories ROM#1, ROM#2, . . . , and ROM#N output respective N data pieces in response to the address signal composed of the the data bit sequence DATA#i and the output signal of the counter 14.

The adder 13 receives the output data pieces from the memories ROM#1, ROM#2, . . . , and ROM#N, and adds and combines them into a digital composite or multiplexed information signal. The adder 13 outputs the digital multiplexed information signal to the D/A converter 15.

The D/A converter 15 changes the digital multiplexed information signal into a corresponding analog multiplexed information signal. The D/A converter 15 outputs the analog multiplexed information signal to a modulator in an RF circuit (not shown) which modulates an RF carrier in response to the analog multiplexed information signal. The RF circuit transmits the resultant modulated RF carrier to the mobile stations.

As previously described, the value represented by the output signal of the counter 14 periodically and cyclically changes from "0" to "$2^m-1$" one by one. After the counter value reaches "$2^m-1$", it is reset to "0" at a next period. Therefore, the interval for which the output signal of the counter 14 changes from the state "0" to the state "$2^m-1$" corresponds to one cycle in which the used effective bit of each spread code SC#i is updated from the bit SC#i(0) to the bit SC#i($2^m-1$). During a next interval, the updating of the used effective bit of each spread code SC#i is repeated.

The transmission de-correlator of FIG. 2 dispenses with multipliers (the multipliers A11–ANN and B11–BNN in FIG. 1). Therefore, the transmission de-correlator of FIG. 2 is advantageous over the prior-art transmission de-correlator of FIG. 1 in structural simplicity.

According to a modification of the transmission de-correlator of FIG. 2, the equations (1) and (2) are replaced by the following equations (3) and (4) respectively.

$$V(0,k) = \sum_{y=1}^{N} 0 \cdot SC\#y(k) \cdot Cyi = 0 \cdot \sum_{y=1}^{N} SC\#y(k) \cdot Cyi \quad (3)$$

$$V(1,k) = \sum_{y=1}^{N} 1 \cdot SC\#y(k) \cdot Cyi = 1 \cdot \sum_{y=1}^{N} SC\#y(k) \cdot Cyi \quad (4)$$

Figure 5:
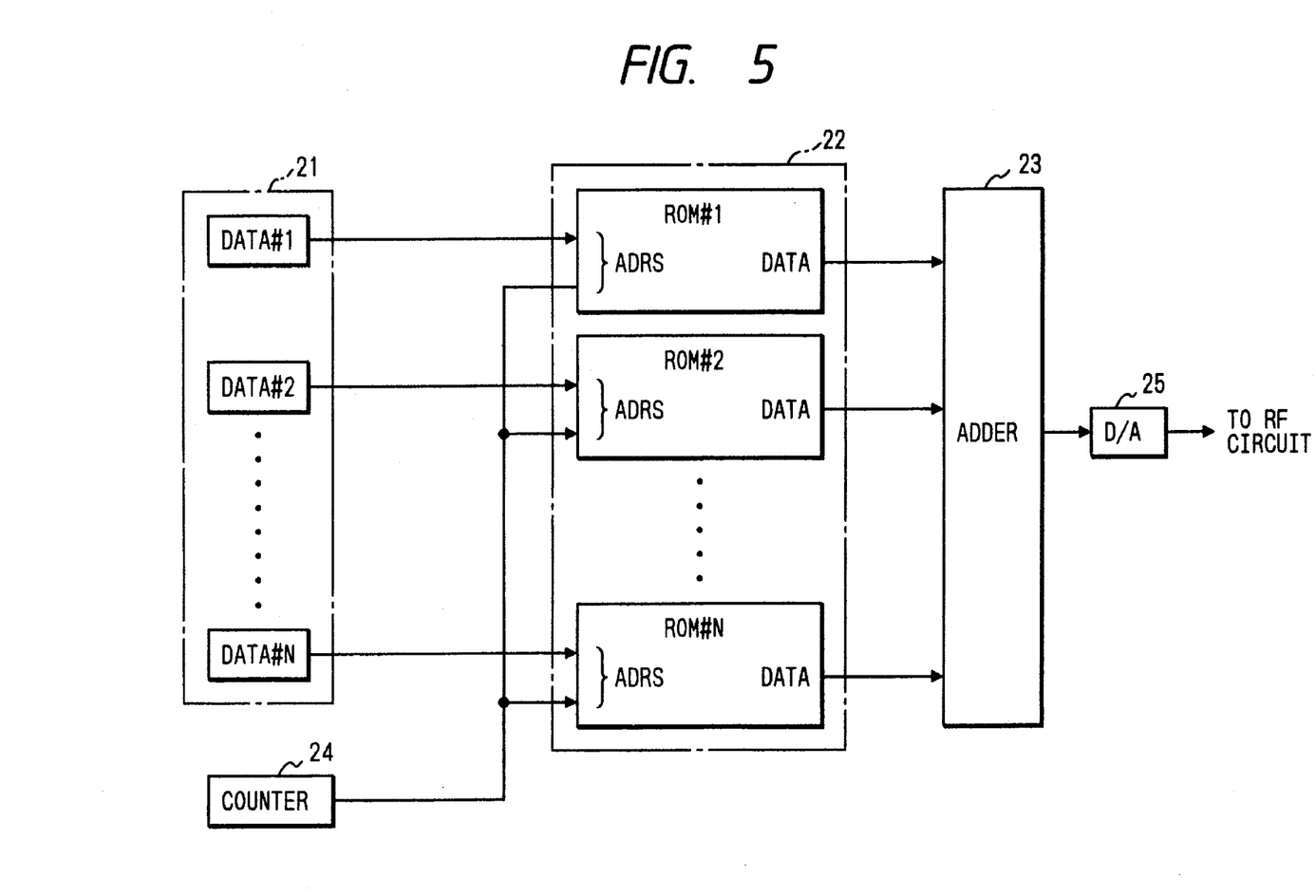
FIG. 5 is a block diagram of a transmission de-correlator according to a second embodiment of this invention.

FIG. 5 shows a transmission de-correlator in a base station of a CDMA communication system according to a second embodiment of this invention. The transmission de-correlator of FIG. 5 is similar to the transmission de-correlator of FIG. 2 except for design changes which will be described later.

The transmission de-correlator of FIG. 5 includes a base-band data generator 21, a storage unit 22, an adder 23, a counter 24, and a D/A converter 25. The base-band data generator 21 is connected to the storage unit 22. The counter 24 is connected to the storage unit 22. The storage unit 22 is connected to the adder 23. The adder 23 is connected to the D/A converter 25.

The base-band data generator 21 outputs N multi-bit data sequences DATA#1, DATA#2, . . . , and DATA#N for respective channels #1, #2, . . . , and #N where N denotes a given natural number. Each of the data sequences DATA#1, DATA#2, . . . , and DATA#N results from a process for power control with $2^w$ levels where "w" denotes a predetermined natural number. Each of the data sequences DATA#i, DATA#2, . . . , and DATA#N thus contains power information, and has "w" bits.

The counter 24 receives a clock pulse signal (not shown) and counts up pulses in the clock pulse signal. The value represented by the output signal of the counter 24 periodically and cyclically changes from "0" to "$2^m-1$" one by one where "m" denotes a given natural number. After the counter value reaches "$2^m-1$", it is reset to "0" at a next period. The period of the clock pulse signal fed to the counter 24 is equal to a period of the data sequences DATA#1, DATA#2, . . . , and DATA#N.

The storage unit 22 includes read-only memories ROM#1, ROM#2, ..., and ROM#N corresponding to the respective channels #1, #2, ..., and #N. As will be made clear later, the memories ROM#1, ROM#2, ..., and ROM#N store predetermined data. The data sequences DATA#1, DATA#2, ..., and DATA#N are applied to the memories ROM#1, ROM#2, ..., and ROM#N respectively. In addition, the output signal of the counter 24 is applied to all the memories ROM#1, ROM#2, ..., and ROM#N.

Regarding each ROM#i of the memories ROM#1, ROM#2, ..., and ROM#N, the data sequence DATA#i and the output signal of the counter 24 compose a multi-bit address signal where "i" denotes 1, 2, ..., or N. The data sequence DATA#i is used as higher bits of the address signal while the output signal of the counter 24 is used as remaining bits (lower bits) of the address signal. Each memory ROM#i has an array of storage segments to which different addresses are assigned respectively. In each memory ROM#i, the storage segments store predetermined different data pieces respectively. In each memory ROM#i, during every period determined by the clock pulse signal, one of the storage segments is accessed in response to the address signal, and the data piece is outputted from the accessed storage segment as output data from the memory ROM#i.

Different spread codes (pseudo-noise codes) SC#1, SC#2, ..., and SC#N are assigned to the respective channels #1, #2, ..., and #N. The spread codes SC#1, SC#2, ..., and SC#N correspond to respective predetermined data bit sequences having a $2^m$-bit length or period. Thus, each spread code SC#i has a temporal sequence of $2^m$ bits SC#i(0), SC#i(1), ..., and SC#i($2^m-1$) where "i" denotes 1, 2, ..., or N.

A set of predetermined coefficients C11, ..., and CNN are designed to cancel or eliminate interferences between the channels #1, #2, ..., and #N. Specifically, the predetermined coefficients C11, ..., and CNN are equal to the respective elements of an inverse matrix with respect to a predetermined matrix representing a cross-correlation between the spread codes SC#1, SC#2, ..., and SC#N for the channels #1, #2, ..., and #N.

As previously described, in each memory ROM#i, one of the storage segments is accessed in response to a multi-bit address signal (A, B), where "A" denotes a first address portion represented by the higher bits and "B" denotes a second address portion represented by the remaining bits (lower bits). The data sequence DATA#i is used as the higher bits of the address signal while the output signal of the counter 24 is used as the remaining bits of the address signal. In each memory ROM#i, the storage segments are designated by different states (addresses) of the address signal (A, B) respectively, and the storage segments store different predetermined data pieces.

In each memory ROM#i, the storage segment designated by the address signal (A, k) stores data piece representing the sum of the multiplication (product) of "A", the spread code bit SC#1(k), and the coefficient Ci1, the multiplication (product) of "A", the spread code bit SC#2(k), and the coefficient Ci2, ..., and the multiplication (product) of "A", the spread code bit SC#N(k), and the coefficient CiN where "k" denotes 0, 1, 2, ..., or $2^m-1$. In other words, the storage segment designated by the address signal (A, k) stores data piece representing the value V(A, k) given as:

$$V(A,k) = \sum_{y=1}^{N} A \cdot SC\#y(k) \cdot Ciy = A \cdot \sum_{y=1}^{N} SC\#y(k) \cdot Ciy \qquad (5)$$

In each memory ROM#i, one of the storage segments is accessed in response to the address signal (A, B) as follows. When the current state of the data sequence DATA#i represents "A" and the output signal from the counter 24 represents "k", that is, when the address signal (A, B) assumes a state of (A, k), an access is given to the storage segment storing the data piece representing the previously-indicated value V(A, k). Therefore, in this case, the data piece representing the sum of the multiplication (product) of "A", the spread code bit SC#1(k), and the coefficient Ci1, the multiplication (product) of "A", the spread code bit SC#2(k), and the coefficient Ci2, ..., and the multiplication (product) of "A", the spread code bit SC#N(k), and the coefficient CiN is outputted from the accessed storage segment.

During every period determined by the clock pulse signal, the memories ROM#1, ROM#2, ..., and ROM#N output respective N data pieces in response to the address signal composed of the the data bit sequence DATA#i and the output signal of the counter 24.

The adder 23 receives the output data pieces from the memories ROM#1, ROM#2, ..., and ROM#N, and adds and combines them into a digital composite or multiplexed information signal. The adder 23 outputs the digital multiplexed information signal to the D/A converter 25.

The D/A converter 25 changes the digital multiplexed information signal into a corresponding analog multiplexed information signal. The D/A converter 25 outputs the analog multiplexed information signal to a modulator in an RF circuit (not shown) which modulates an RF carrier in response to the analog multiplexed information signal. The RF circuit transmits the resultant modulated RF carrier to the mobile stations.

As previously described, the value represented by the output signal of the counter 24 periodically and cyclically changes from "0" to "$2^m-1$" one by one. After the counter value reaches "$2^m-1$", it is reset to "0" at a next period. Therefore, the interval for which the output signal of the counter 24 changes from the state "0" to the state "$2^m-1$" corresponds to one cycle in which the used effective bit of each spread code SC#i is updated from the bit SC#i(0) to the bit SC#i($2^m-1$). During a next interval, the updating of the used effective bit of each spread code SC#i is repeated.

The transmission de-correlator of FIG. 5 dispenses with multipliers (the multipliers A11–ANN and B11–BNN in FIG. 1). Therefore, the transmission de-correlator of FIG. 5 is advantageous over the prior-at transmission de-correlator of FIG. 1 in structural simplicity.

According to a modification of the transmission de-correlator of FIG. 5, the equation (5) is replaced by the following equation (6).

$$V(A,k) = \sum_{y=1}^{N} A \cdot SC\#y(k) \cdot Cyi = A \cdot \sum_{y=1}^{N} SC\#y(k) \cdot Cyi \qquad (6)$$

Figure 6:
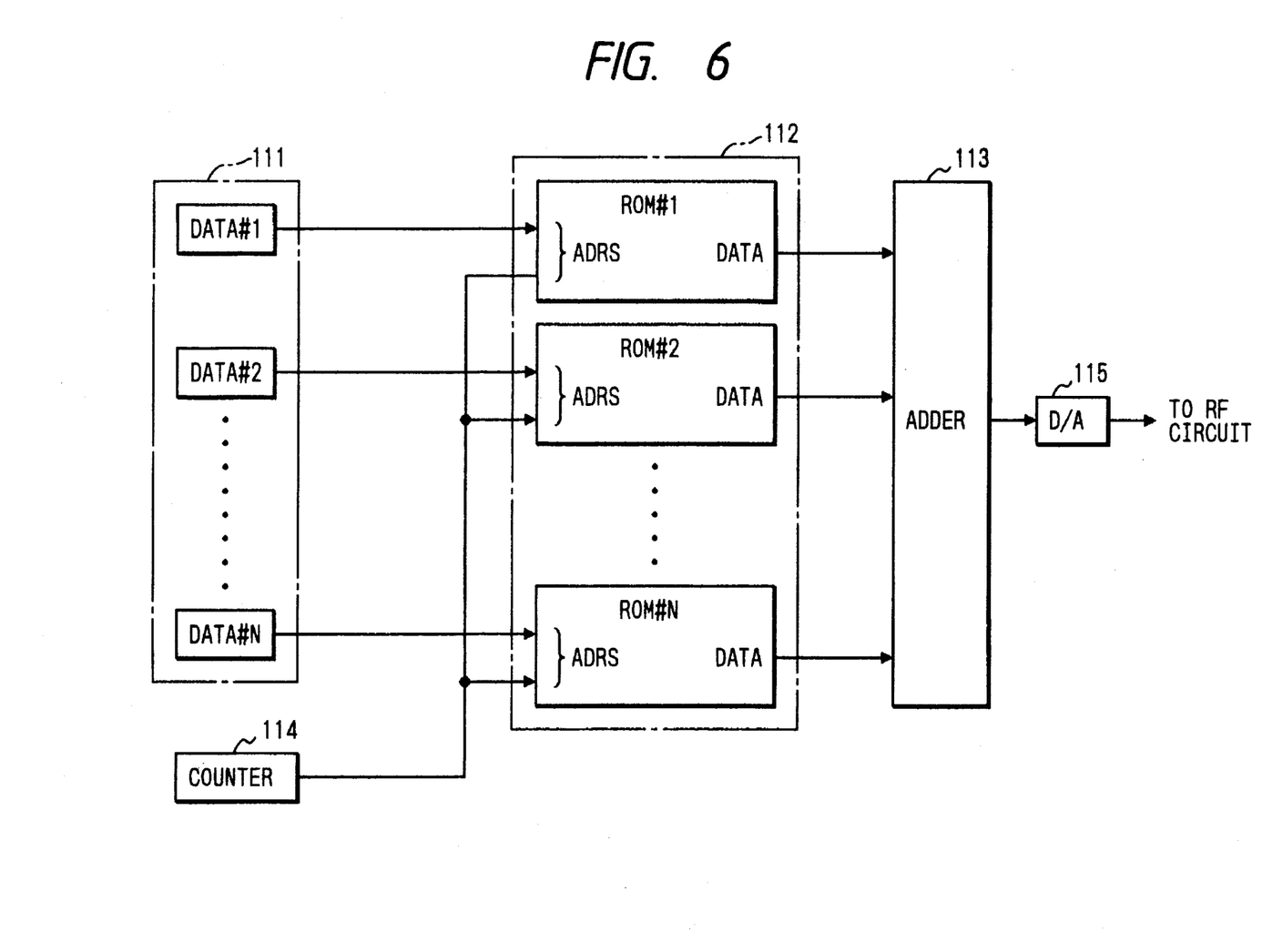
FIG. 6 is a block diagram of a transmission de-correlator according to a third embodiment of this invention.

FIG. 6 shows a transmission de-correlator in a base station of a CDMA communication system according to a third embodiment of this invention. As shown in FIG. 6, the transmission de-correlator includes a base-band data generator 111, a storage unit 112, an adder 113, a counter 114, and a D/A converter 115. The base-band data generator 111 is connected to the storage unit 112. The counter 114 is connected to the storage unit 112. The storage unit 112 is connected to the adder 113. The adder 113 is connected to the D/A converter 115.

The base-band data generator 111, the counter 114, and the D/A converter 115 are similar to the base-band data generator 11, the counter 14, and the D/A converter 15 of FIG. 2 respectively.

The storage unit 112 includes read-only memories ROM#1, ROM#2, ..., and ROM#N corresponding to the respective channels #1, #2, ..., and #N. As will be made clear later, the memories ROM#1, ROM#2, ..., and ROM#N store predetermined data. The data bit sequences DATA#1, DATA#2, ..., and DATA#N are applied to the memories ROM#1, ROM#2, ..., and ROM#N respectively. In addition, the output signal of the counter 114 is applied to all the memories ROM#1, ROM#2, ..., and ROM#N.

Regarding each ROM#i of the memories ROM#1, ROM#2, ..., and ROM#N, the data bit sequence DATA#i and the output signal of the counter 114 compose a multi-bit address signal where "i" denotes 1, 2, ..., or N. The data bit sequence DATA#i is used as the highest bit of the address signal while the output signal of the counter 114 is used as the remaining bits (the second highest bit to the lowest bit) of the address signal. Each memory ROM#i has an array of storage segments to which different addresses are assigned respectively. In each memory ROM#i, the storage segments store predetermined different data pieces respectively. In each memory ROM#i, during every period determined by the clock pulse signal, members of the storage segments are accessed in response to the address signal, and the data pieces are outputted from the accessed storage segments as output data from the memory ROM#i.

Different spread codes (pseudo-noise codes) SC#1, SC#2, ..., and SC#N are assigned to the respective channels #1, #2, ..., and #N. The spread codes correspond to respective predetermined data bit sequences having a $2^m$-bit length or period. Thus, each spread code SC#i has a temporal sequence of $2^m$ bits SC#i(0), SC#i(1), ..., and SC#i($2^m-1$) where "i" denotes 1, 2, ..., or N.

A set of predetermined coefficients C11, ..., and CNN are designed to cancel or eliminate interferences between the channels #1, #2, ..., and #N. Specifically, the predetermined coefficients C11, ..., and CNN are equal to the respective elements of an inverse matrix with respect to a predetermined matrix representing a cross-correlation between the spread codes SC#1, SC#2, ..., and SC#N for the channels #1, #2, ..., and #N.

Figure 7:
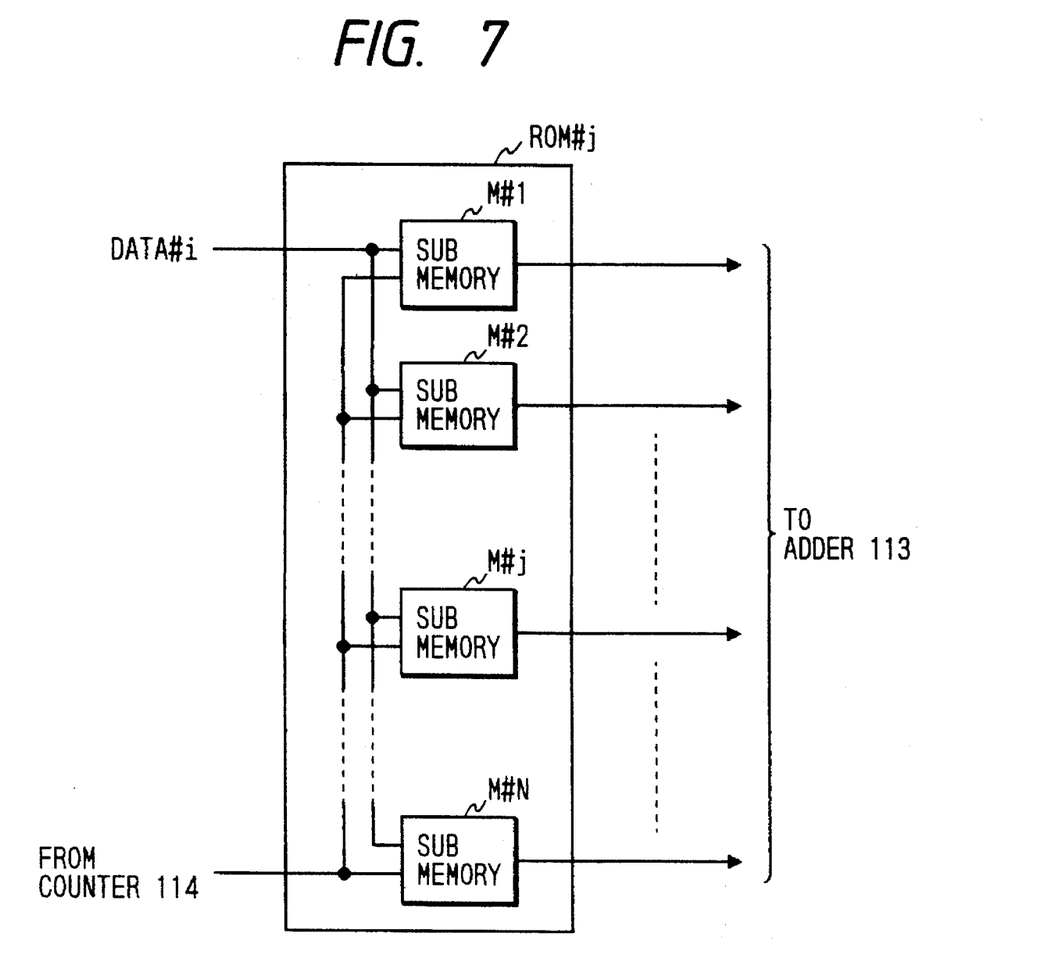
FIG. 7 is a block diagram of a memory within a storage unit in FIG. 6.

As shown in FIG. 7, each ROM#i of the memories ROM#1, ROM#2, ..., and ROM#N includes sub read-only memories M#1, M#2, ..., M#j, ..., and M#N corresponding to the respective spread codes SC#1, SC#2, ..., SC#N where "j" denotes 1, 2, ..., or N. The sub memories M#1, M#2, ..., M#j, ..., and M#N are accessed in response to a common multi-bit address signal (A, B), where "A" denotes a first address portion represented by the highest bit and "B" denotes a second address portion represented by the remaining bits (the second highest bit to the lowest bit). The data bit sequence DATA#i is used as the highest bit of the address signal while the output signal of the counter 114 is used as the remaining bits of the address signal. The first address portion "A" is "0" or "1". The second address portion "B" is one of "0" to "$2^m-1$". Each M#j of the sub memories M#1, M#2, ..., and M#N has storage segments which are designated by different states (addresses) of the address signal (A, B). In each sub memory M#j, the storage segments store different predetermined data pieces.

Figure 8:
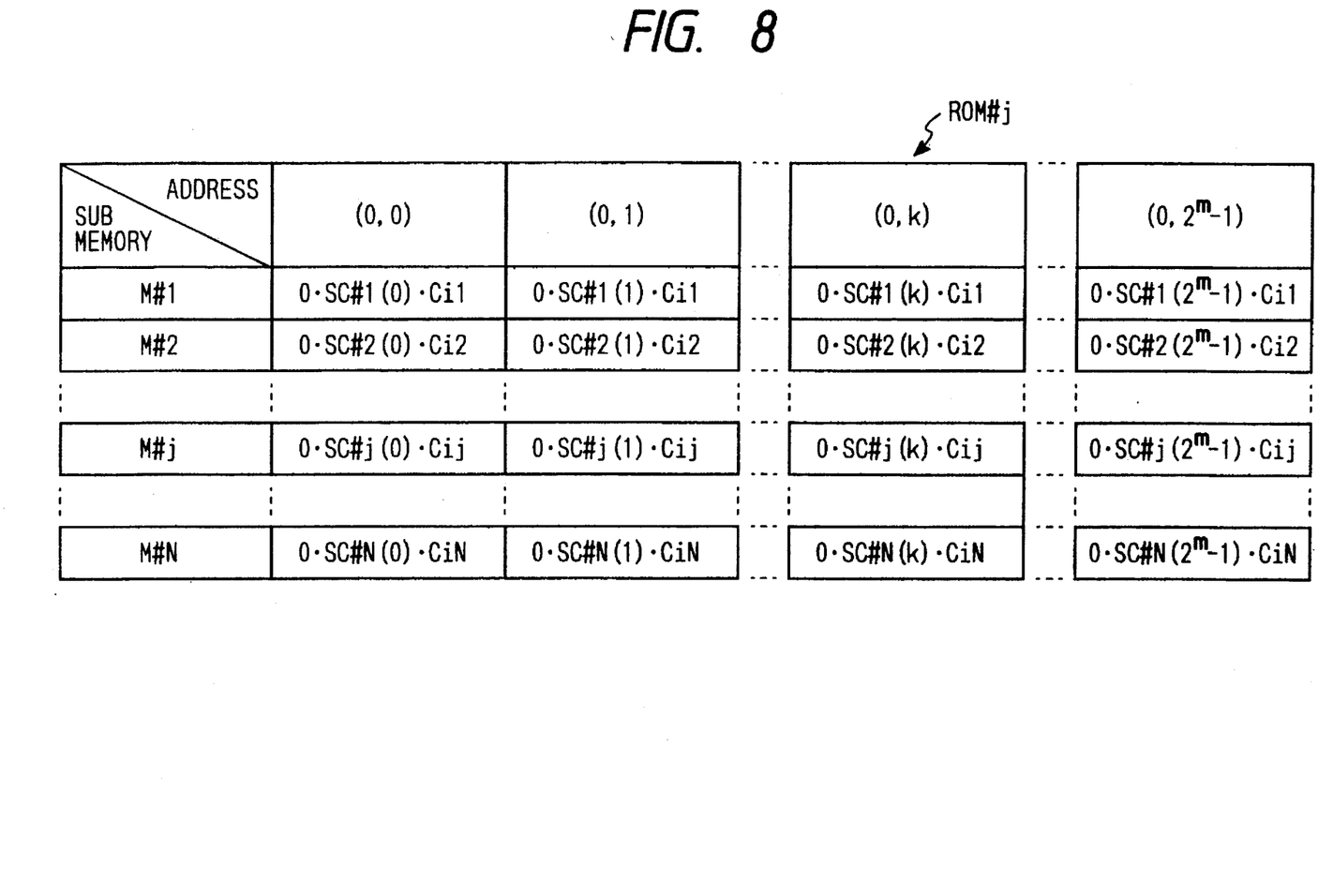
FIGS. 8 and 9 are diagrams of the relation between addresses and data in sub memories in FIG. 7.

As shown in FIG. 8, in the sub memory M#j, the storage segment designated by the address signal (0, k) stores a data piece representing the multiplication (product) of "0", the spread code bit SC#j(k), and the coefficient Cij where "k" denotes 0, 1, 2, ..., or $2^m-1$. For example, the storage segment designated by the address signal (0, 0) stores data piece representing the multiplication (product) of "0", the spread code bit SC#j(0), and the coefficient Cij. The storage segment designated by the address signal (0, 1) stores a data piece representing the multiplication (product) of "0", the spread code bit SC#j(1), and the coefficient Cij. The storage segment designated by the address signal (0, $2^m-1$) stores a data piece representing the multiplication (product) of "0", the spread code bit SC#j($2^m-1$), and the coefficient Cij.

Figure 9:
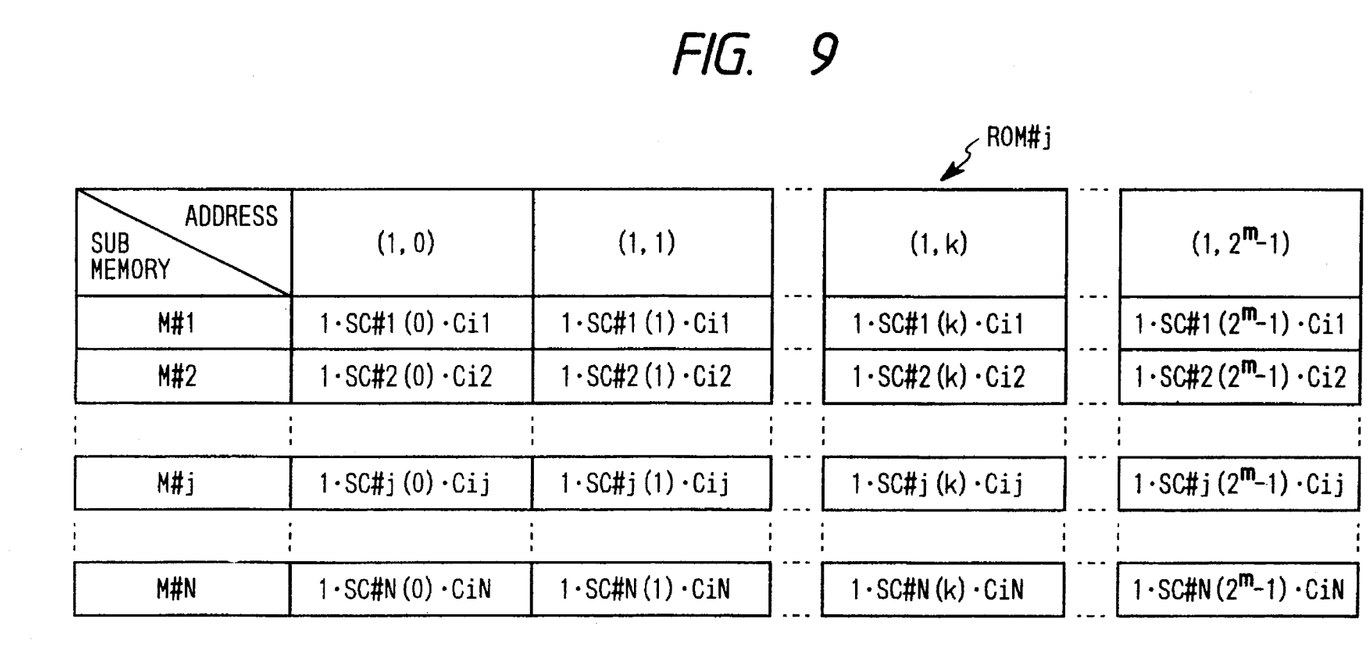

As shown in FIG. 9, in the sub memory M#j, the storage segment designated by the address signal (1, k) stores a data piece representing the multiplication (product) of "1", the spread code bit SC#j(k), and the coefficient Cij where "k" denotes 0, 1, 2, ..., or $2^m-1$. For example, the storage segment designated by the address signal (1, 0) stores a data piece representing the multiplication (product) of "1", the spread code bit SC#j(0), and the coefficient Cij. The storage segment designated by the address signal (1, 1) stores a data piece representing the multiplication (product) of "1", the spread code bit SC#j(1), and the coefficient Cij. The storage segment designated by the address signal (1, $2^m-1$) stores a data piece representing the multiplication (product) of "1", the spread code bit SC#j($2^m-1$), and the coefficient Cij.

In each ROM#i of the memories ROM#1, ROM#2, ..., and ROM#N, the storage segments of the sub memories M#1, M#2, ..., and M#N are accessed in response to the address signal (A, B) as follows. When the current bit in the data bit sequence DATA#i represents "0" and the output signal from the counter 114 represents "k", that is, when the address signal (A, B) assumes a state of (0, k), accesses are given to the storage segments storing the data pieces representing the multiplication (product) of "0", the spread code bit SC#1(k), and the coefficient Ci1, the multiplication (product) of "0", the spread code bit SC#2(k), and the coefficient Ci2, ..., and the multiplication (product) of "0", the spread code bit SC#N(k), and the coefficient CiN, respectively. Therefore, in this case, the data pieces representing the multiplication (product) of "0", the spread code bit SC#1(k), and the coefficient Ci1, the multiplication (product) of "0", the spread code bit SC#2(k), and the coefficient Ci2, ..., and the multiplication (product) of "0", the spread code bit SC#N(k), and the coefficient CiN are outputted from the accessed storage segments. When the current bit in the data bit sequence DATA#i represents "1" and the output signal from the counter 114 represents "k", that is, when the address signal (A, B) assumes a state of (1, k), accesses are given to the storage segments storing the data pieces representing the multiplication (product) of "1", the spread code bit SC#1(k), and the coefficient Ci1, the multiplication (product) of "1", the spread code bit SC#2(k), and the coefficient Ci2, ..., and the multiplication (product) of "1", the spread code bit SC#N(k), and the coefficient CiN, respectively. Therefore, in this case, the data pieces representing the multiplication (product) of "1", the spread code bit SC#1(k), and the coefficient Ci1, the multiplication (product) of "1", the spread code bit SC#2(k), and the coefficient Ci2, ..., and the multiplication (product) of "1", the spread code bit SC#N(k), and the coefficient CiN are outputted from the accessed storage segments.

During every period determined by the clock pulse signal, each memory ROM#i outputs N data pieces (corresponding to the respective spread codes SC#1, SC#2, ..., SC#N) in response to the address signal composed of the the data bit sequence DATA#i and the output signal of the counter 114. It should be noted that the output data pieces from the memories ROM#1, ROM#2, ..., and ROM#N correspond to the output signals from the multipliers B11, ..., BNN in the mixing circuit 32 of FIG. 1.

The adder 113 receives the output data pieces from the memories ROM#1, ROM#2, ..., and ROM#N, and adds and combines them into a digital composite or multiplexed information signal. The adder 113 outputs the digital multiplexed information signal to the D/A converter 115.

The D/A converter 115 changes the digital multiplexed information signal into a corresponding analog multiplexed information signal. The D/A converter 115 outputs the analog multiplexed information signal to a modulator in an RF circuit (not shown) which modulates an RF carrier in response to the analog multiplexed information signal. The RF circuit transmits the resultant modulated RF carrier to the mobile stations.

As previously described, the value represented by the output signal of the counter 114 periodically and cyclically changes from "0" to "$2^m-1$" one by one. After the counter value reaches "$2^m-1$", it is reset to "0" at a next period. Therefore, the interval for which the output signal of the counter 114 changes from the state "0" to the state "$2^m-1$" corresponds to one cycle in which the used effective bit of each spread code SC#i is updated from the bit SC#i(0) to the bit SC#i($2^m-1$). During a next interval, the updating of the used effective bit of each spread code SC#i is repeated.

The transmission de-correlator of FIG. 6 dispenses with multipliers (the multipliers A11–ANN and B11–BNN in FIG. 1). Therefore, the transmission de-correlator of FIG. 6 is advantageous over the prior-art transmission de-correlator of FIG. 1 in structural simplicity.

What is claimed is:

1. In a base station of a CDMA communication system, a transmission de-correlator for eliminating interferences between communication channels of a downlink, comprising:

a memory means for storing a set of data representative of the products of transmission information bits for the respective channels, and the sums of the products of the spread code data sequences for the respective channels, and the elements of an inverse matrix with respect to a predetermined matrix of a cross-correlation between the spread code data sequences for the respective channels, wherein said sums correspond to additions of the products along the columns of said inverse matrix or to additions of the products along the rows of the inverse matrix;

a counting means connected to an address input of said memory means for causing the memory means to sequentially output the data therefrom; and an adder connected to receive data from said memory means for calculating a sum of the data received from the memory means.

2. In a base station of a CDMA communication system, a transmission de-correlator for eliminating interferences between communication channels of a downlink, comprising:

a memory means for storing a set of data representative of the products of multi-bit transmission information pieces for the respective channels, and the sums of the products of the spread code data sequences for the respective channels, and the elements of an inverse matrix with respect to a predetermined matrix of a cross-correlation between the spread code data sequences for the respective channels, wherein said multi-bit transmission information pieces contain power information pieces for power controls of the respective channels, and wherein said sums correspond to additions of the products along the columns or to additions of the products along the rows of the inverse matrix;

a counting means connected to an address input of said memory means for causing the memory means to sequentially output the data therefrom; and an adder for receiving data from said memory means and for calculating a sum of the data outputted from the memory means.

3. In a base station of a CDMA communication system, a transmission de-correlator for eliminating interferences between communication channels of a downlink, comprising:

means for generating information pieces to be transmitted for the respective channels;

a storage unit including a plurality of memories;

means for applying the generated information pieces to the memories as a first portion of an address signal, respectively;

means for generating a second periodically repeated portion of the address signal to the memories, respectively;

wherein each of the memories contains a plurality of storage segments which are designated by different states of a related address signal, respectively, said storage segments storing respective predetermined data pieces, wherein said predetermined data pieces depend on products of possible states of the information piece to be transmitted for a related communication channel, predetermined spread codes, and elements of an inverse matrix with respect to a predetermined matrix of a cross-correlation between the spread codes, and wherein in each of the memories, one of the storage segments is accessed in response to the related address signal and the data piece is outputted from the accessed storage segment; and means for adding data pieces outputted from the memories.

\* \* \* \* \*